United States Patent
Wu et al.

(10) Patent No.: US 10,683,939 B1
(45) Date of Patent: Jun. 16, 2020

(54) OCEAN DEPTH AUTOMATIC COMPENSATION TYPE FULL-OCEAN-DEPTH HYDRAULIC CONTROL WATER STOP VALVE

(71) Applicant: Huazhong University of Science and Technology, Wuhan, Hubei (CN)

(72) Inventors: Defa Wu, Hubei (CN); Chao Li, Hubei (CN); Yinshui Liu, Hubei (CN); Qian Cheng, Hubei (CN); Zhenyao Wang, Hubei (CN); Guang Luo, Hubei (CN); Yipan Deng, Hubei (CN); Hao Pang, Hubei (CN); Xiaomin Zhai, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 0 days.

(21) Appl. No.: 16/245,841

(22) Filed: Jan. 11, 2019

(51) Int. Cl.
| | |
|---|---|
| *F16K 27/02* | (2006.01) |
| *F16K 1/42* | (2006.01) |
| *F16K 1/36* | (2006.01) |
| *F16K 27/06* | (2006.01) |
| *F16K 1/48* | (2006.01) |
| *F16K 27/12* | (2006.01) |

(52) U.S. Cl.
CPC ............... *F16K 1/422* (2013.01); *F16K 1/36* (2013.01); *F16K 1/487* (2013.01); *F16K 27/02* (2013.01); *F16K 27/065* (2013.01); *F16K 27/12* (2013.01)

(58) Field of Classification Search
CPC . F16K 1/422; F16K 1/36; F16K 1/487; F16K 27/02; F16K 27/065; F16K 27/12
See application file for complete search history.

(56) References Cited

U.S. PATENT DOCUMENTS

| | | | | |
|---|---|---|---|---|
| 5,546,980 | A * | 8/1996 | Kosarzecki | ............. F16K 27/02 137/454.5 |
| 2016/0097574 | A1* | 4/2016 | Kaneko | .................. F16K 27/02 62/225 |
| 2016/0230896 | A1* | 8/2016 | Godbillon | ............... B60T 8/363 |
| 2019/0195384 | A1* | 6/2019 | Ito | ............................ F16K 1/42 |

* cited by examiner

*Primary Examiner* — P. Macade Nichols
(74) *Attorney, Agent, or Firm* — Hamre, Schumann, Mueller & Larson, P.C.

(57) ABSTRACT

An ocean depth automatic compensation type full-ocean-depth hydraulic control water stop valve includes a valve body having an inlet and outlet on a side thereof; a valve sleeve assembly embedded in the valve body; and a valve core assembly. The valve sleeve assembly includes a spring cover; a pressure rod valve sleeve; a valve core cover; a valve seat; a pressing piece; a push rod valve sleeve base body; and a screw plug. The valve core assembly includes a pressure rod; a valve core; and a push rod.

6 Claims, 3 Drawing Sheets

OCEAN DEPTH AUTOMATIC COMPENSATION TYPE FULL-OCEAN-DEPTH HYDRAULIC CONTROL WATER STOP VALVE

BACKGROUND OF THE INVENTION

Technical Field

The present invention belongs to the field of valves, and more particularly relates to an ocean depth automatic compensation type full-ocean-depth hydraulic control water stop valve, which can be applied to the opening and closing control of pipelines of water hydraulic systems in deep sea equipment.

Description of the Related Art

The vast ocean, which accounts for 70% of the Earth's surface, is a treasure trove of resources for human survival and development. However, in more than 90% of the sea area, its ocean depth is between 200 to 6000 meters, and the average ocean depth reaches 3730 meters. Due to rich mineral resources in the deep sea, the development of the ocean has begun to move from the shallow sea to the deep sea, and the large-depth manned or unmanned submersible is an important carrier for the development of the ocean to the deep sea. The seawater ballast regulation system is an important subsystem of the submersible, and represents a development direction of the ballast regulation of the large-depth submersible, the principle of which is to realize the transfer and exchange of the water medium between the ballast tank and the environment through a sea water pump and a control valve, thereby achieving the dynamic adjustment of the gravity and buoyancy of the submersible to enable descent/ascent motion of the submersible, or to keep the submersible in a relatively stable work posture, or to compensate for change in seawater density and deformation of the submersible at deep sea conditions.

The deep-sea water stop valve controls the flow direction of ballast water to achieve water injection or drainage. The water injection is carried out by injecting the ambient water into a ballast water tank through a sea water pump and a water stop valve, so that the weight of the submersible is increased; the drainage is carried out by draining the seawater in the ballast water tank into the environment through the sea water pump and the water stop valve, so that the weight of the submersible is reduced. The reliable operation of the water stop valve concerns the normal water injection or drainage of the system, and the sealing performance of the water stop valve affects the weight drift of the submersible during operation.

At present, the opening and closing of the water stop valves are generally controlled by air control, manual control, electronic control and hydraulic control. When the working pressure of the water stop valve is high, the air control and hydraulic control are generally adopted, and since the manual control and electronic control are limited by the working pressure, they can only work in a case of a small rated pressure. Since the water stop valve is completely immersed in the high-pressure seawater when working in the deep sea, water stop valves used on land cannot meet the requirements of deep sea conditions. In addition, this type of regulating valves generally have a cone valve structure, resulting in poor self-aligning ability of the regulating valve core, and due to the particularity of the buoyancy regulating system, this type of regulating valves may have problems under certain special working conditions. Therefore, there is an urgent need in the art to provide a hydraulic control water stop valve that can be applied in deep sea complex conditions.

SUMMARY OF THE INVENTION

In view of the above-described defects or improvement requirements in the art, the present invention provides an ocean depth automatic compensation type full-ocean-depth hydraulic control water stop valve, in which according to the special working condition of full-ocean-depth, the water stop valve suitable for this working condition is specially designed, and through designing the specific structure and specific arrangement of key components such as a valve sleeve assembly and a valve core assembly, the problem that the conventional water stop valves are difficult to adapt to the full-ocean-depth condition can be effectively solved. Meanwhile, this water stop valve has the advantages of stable work performance, good sealing, automatic compensation and the like. Therefore, reliable opening and closing control of pipelines of the seawater hydraulic system can be achieved in a sea area with any depth.

In order to achieve the above objective, the present invention provides an ocean depth automatic compensation type full-ocean-depth hydraulic control water stop valve, comprising a valve body, a valve sleeve assembly and a valve core assembly, wherein:

the valve body has a hollow structure with an inlet and an outlet on its side, the valve sleeve assembly is embedded in the valve body and includes a spring cover, a pressure rod valve sleeve, a valve core cover, a valve seat, a pressing piece, a push rod valve sleeve base body and a screw plug which are sequentially disposed from top to bottom, the spring cover is connected to an upper end of the valve body, a pressure rod balance port is provided at an upper end of the spring cover, a groove for mounting a spring is provided at a lower end of the spring cover, a valve port and a valve seat through-flow hole are provided in the valve seat, the valve seat through-flow hole communicates the valve port with the outlet, a valve core cover chamber and a valve core cover through-flow hole are provided in the valve core cover, the valve core cover chamber is communicated with the valve port, the valve core cover through-flow hole communicates the valve core cover chamber with the inlet, the screw plug is connected to a lower end of the valve body, and a control port is provided in the screw plug;

the valve core assembly includes a pressure rod, a valve core and a push rod which are sequentially disposed from top to bottom, the pressure rod is sequentially inserted into the pressure rod valve sleeve and the valve core cover, an upper end of the pressure rod is abutted against the spring, the valve core is disposed in a cavity formed between the valve core cover chamber and the valve port, and the push rod has a lower end mounted in the push rod valve sleeve base body and an upper end sequentially inserted into the pressing piece and the valve seat.

Preferably, a ceramic sleeve is disposed between the lower end of the push rod and the push rod valve sleeve base body; the valve core is specifically a spherical valve core, preferably a zirconia ceramic ball; and the valve port is chamfered.

Further preferably, the spring cover and the pressure rod valve sleeve are sealed by a spring cover O-ring, the pressure rod valve sleeve and the valve body are sealed by a pressure rod valve sleeve static sealing ring, the pressure rod and the pressure rod valve sleeve are sealed by a pressure rod valve sleeve dynamic sealing ring, the valve seat and the valve body are sealed by a valve seat sealing ring, the push rod and the pressing piece are sealed by a pressing piece dynamic sealing ring, the pressing piece and the valve body are sealed by a pressing piece static sealing ring, the push rod valve sleeve base body and the valve body are sealed by a push rod valve sleeve sealing ring, and the push rod and the ceramic sleeve are sealed by a push rod sealing ring.

Further preferably, a valve seat through-flow groove and a valve core cover through-flow groove are provided inside the valve body, the valve seat through-flow groove is communicated with the outlet, the valve core cover through-flow groove is communicated with the inlet, a spring cover threaded hole and a screw plug threaded hole are further provided on the valve body, the spring cover threaded hole is screwed to the spring cover, and the screw plug threaded hole is screwed to the screw plug.

Further preferably, a part of the push rod inserted into the pressing piece and the valve seat is sprayed with ceramic, and a part of the pressure rod inserted into the pressure rod valve sleeve and the valve core cover is sprayed with ceramic.

Further preferably, the spring cover, the screw plug and the valve body are made of titanium alloy material, and the pressure rod valve sleeve, the valve core cover, the valve seat, the pressing piece, the push rod valve sleeve base body, the push rod and the pressure rod are made of stainless steel material.

In general, by comparing the above technical solution of the present inventive concept with the prior art, the present invention has the following beneficial effects:

1) in the present invention, according to the ocean depth working condition, the water stop valve suitable for this working condition is specially designed, and through designing the specific structure and specific arrangement of key components such as a valve sleeve assembly and a valve core assembly, the obtained water stop valve can meet the requirements of sea-deep work, with the advantages of stable performance and convenient operation, and can achieve reliable opening and closing control in full-ocean-depth range, the maximum working pressure being 118 Mpa.

2) in the water stop valve according to the present invention, through providing a pressure rod balance port and a push rod balance port which are communicated with the ocean depth environment during use, the force on the valve core can be effectively balanced and compensated, so that when the water stop valve is not opened, the valve port is kept sealed under any working conditions.

3) in the water stop valve according to the present invention, the valve core of the water stop valve is a spherical valve core, forming a ball valve structure. The independent spherical valve core has a good self-aligning function to improve the sealing reliability of the valve port, and reduces the coaxiality processing requirements of other parts to reduce the processing difficulty. In addition, the valve port of the valve seat is chamfered, so that the force on the valve port is more even and reasonable.

4) in the water stop valve according to the present invention, a combination of ceramic and stainless steel is adopted between the respective opposite movable parts, that is, a combination of ceramic and stainless steel is adopted between the valve rods and the corresponding valve sleeves, thereby reducing frictional wear between the valve rods and the corresponding valve sleeves and avoiding clamping stagnation between the valve rods and the corresponding valve sleeves.

5) in the water stop valve according to the present invention, through providing a control port which is connected with a deep-sea hydraulic source during use, opening and closing of the valve port of the water stop valve may be arbitrarily controlled, which may be achieved by remote control operation. Since the full-ocean-depth water stop valve has a high working pressure, the valve port of the water stop valve is opened by hydraulic control, which may be achieved by remote control operation.

6) in the present invention, the water stop valve adopts the form of inserting structure as a whole, and features good sealing, convenient installation and maintenance and the like.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
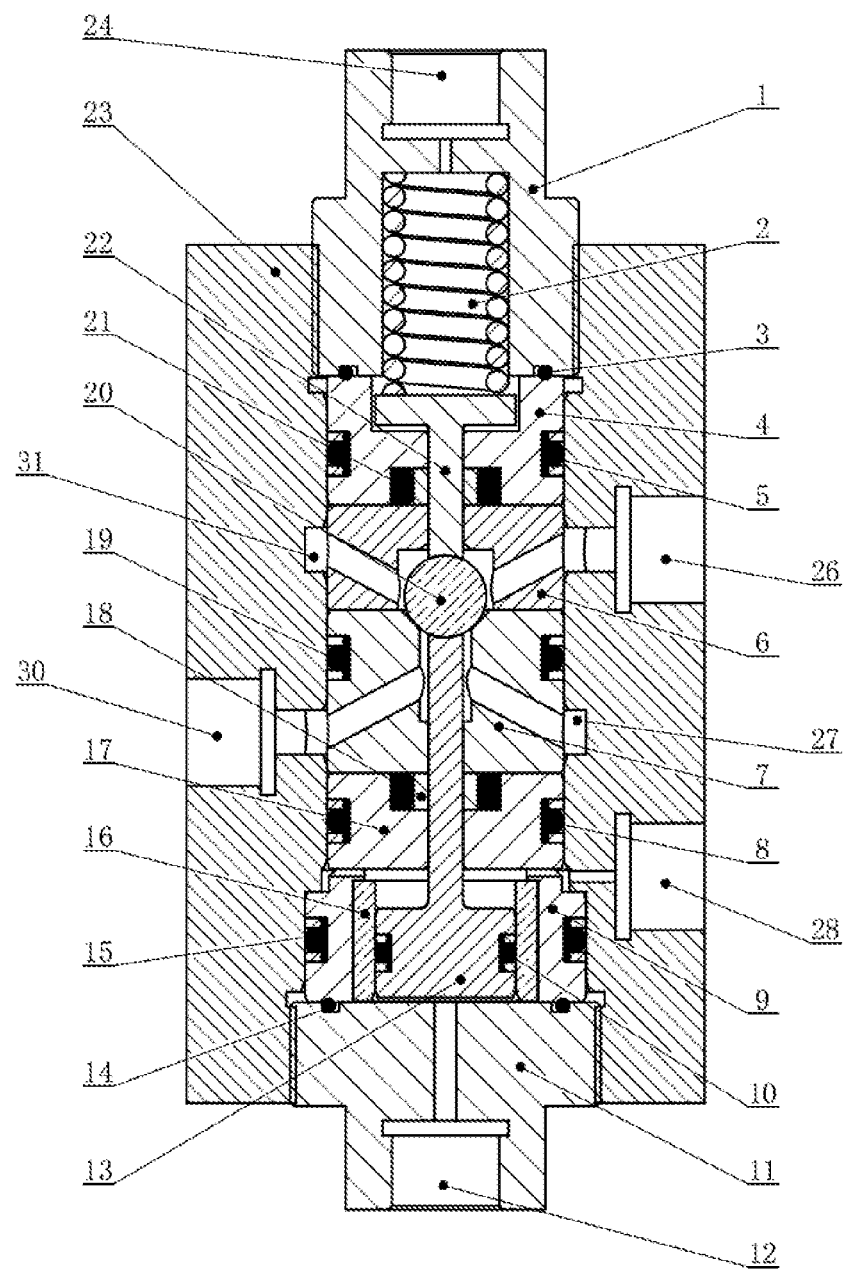
FIG. 1 is a schematic structural diagram of an ocean depth automatic compensation type full-ocean-depth hydraulic control water stop valve according to an embodiment of the present invention.
Figure 2:
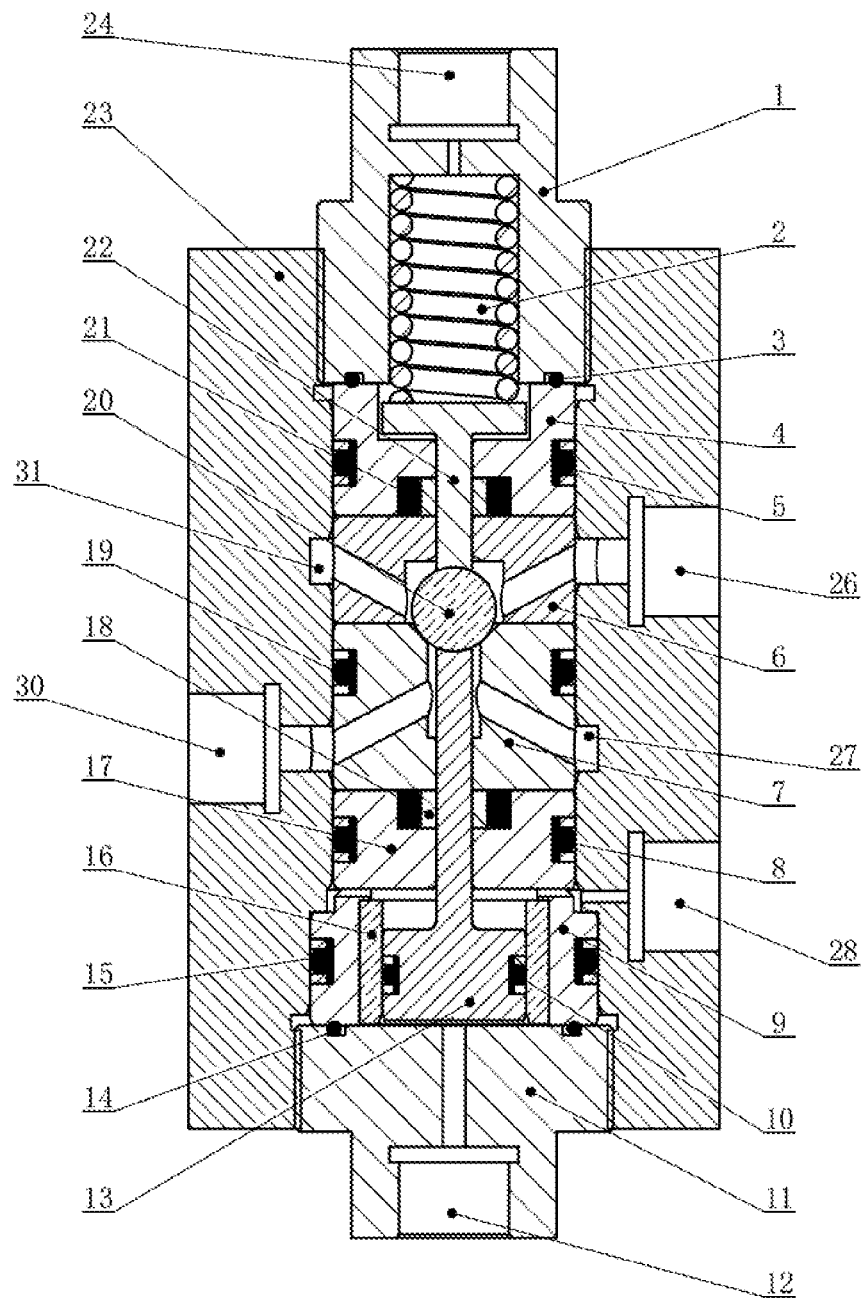
FIG. 2 is a schematic structural diagram of a valve body according to the embodiment of the present invention.
Figure 3:
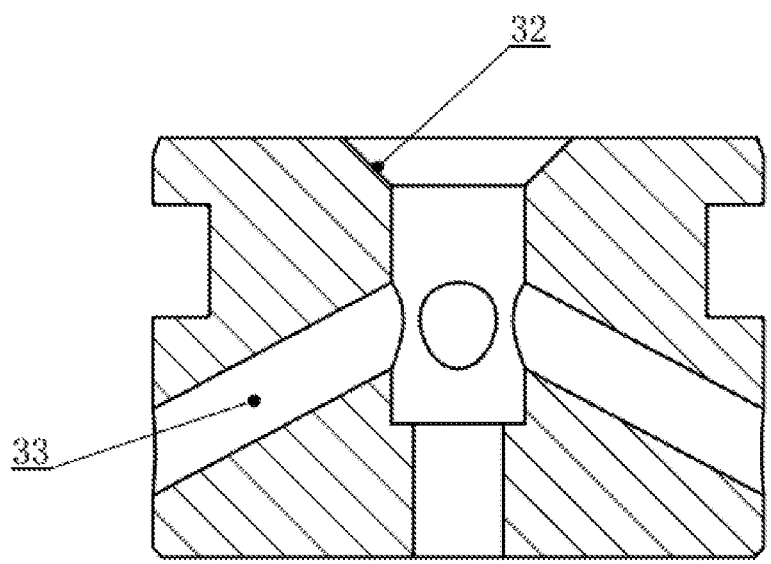
FIG. 3 is a schematic structural diagram of a valve seat according to the embodiment of the present invention.
Figure 4:
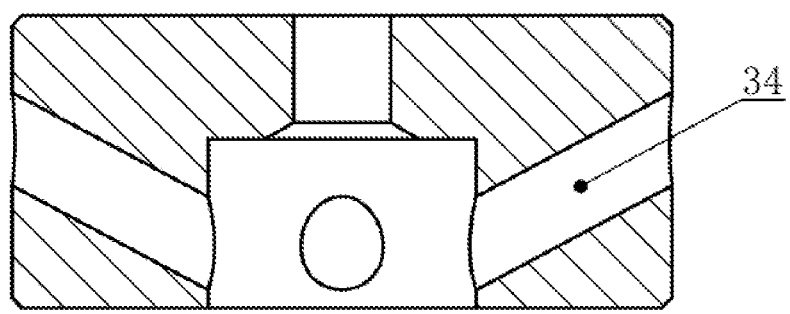
FIG. 4 is a schematic structural diagram of a valve core according to the embodiment of the present invention.

As shown in FIG. 1-3, an ocean depth automatic compensation type full-ocean-depth hydraulic control water stop valve according to an embodiment of the present invention includes a valve body 23, a valve sleeve assembly and a valve core assembly, in which the valve body 23 has a hollow structure with an inlet 26 and an outlet 30 on its side; the valve sleeve assembly is embedded in the valve body 23 and includes a spring cover 1, a pressure rod valve sleeve 4, a valve core cover 6, a valve seat 7, a pressing piece 17, a push rod valve sleeve base body 9 and a screw plug 11 which are sequentially disposed from top to bottom, the valve sleeve assembly is axially positioned by the step surface on the push rod valve sleeve base body 9; the spring cover 1 is connected to an upper end of the valve body 23, a pressure rod balance port 24 is provided at an upper end of the spring cover 1 and a groove for mounting the spring 2 is provided at a lower end of the spring cover 1; a valve port 32 and a valve seat through-flow hole 33 are provided in the valve seat 7, in which the valve port 32 is chamfered, the valve seat through-flow hole 33 communicates the valve port 32 with the outlet 30; a valve core cover chamber and a valve core cover through-flow hole 34 are provided in the valve core cover 6, in which the valve core cover chamber is communicated with the valve port 32, and the valve core cover through-flow hole 34 communicates the valve core cover chamber with the inlet 26; the screw plug 11 is connected to a lower end of the valve body 23, and a control port 12 is provided in the screw plug 11; the valve core assembly includes a pressure rod 22, a valve core 20 and a push rod 13 which are sequentially disposed from top to bottom, in which the pressure rod is used to balance the ocean depth pressure, so that the valve port can be kept closed under any working condition, and the push rod is used to push the valve core to open the valve port; specifically, the pressure rod 22 is sequentially inserted into the pressure rod valve sleeve 4 and the valve core cover 6, and has an upper end abutted against the spring 2 and a lower end protruding into the valve core cover chamber; a lower end of the push rod 13 is mounted in the push rod valve sleeve base body 9, an upper end of the push rod 13 is sequentially inserted into the pressing piece 17 and the valve seat 7 and protrudes into the valve port 32; and the valve core 20 is disposed in a cavity formed between the valve core cover chamber and the valve port, and is located between the pressure rod 22 and the push rod 13. Further, the valve core is specifically a spherical valve core, preferably a high-precision zirconia ceramic ball, so that the water stop valve according to the present invention has a ball valve structure and thus has the advantage of good self-aligning performance.

Further, a ceramic sleeve 16 is disposed between the lower end of the push rod and the push rod valve sleeve base body. Preferably, the push rod 13 comprises a large end and a small end, in which the large end is embedded in the push rod valve sleeve base body 9, and the small end is sequentially inserted into the pressing piece 17 and the valve seat 7 and protrudes into the valve port 32. When a ceramic sleeve 16 is provided, the large end of the push rod is embedded in the ceramic sleeve 16. Similarly, the pressure rod 22 is also designed to include a large end and a small end, in which the large end is embedded in an upper part of the pressure rod valve sleeve 4, and the small end is sequentially inserted into a lower part of the pressure rod valve sleeve 4 and the valve core cover 6. Further, outer surfaces of the small ends of the push rod 13 and the pressure rod 22 are sprayed with ceramic. Preferably, materials of the pressure rod valve sleeve 4, the valve core cover 6, the valve seat 7, the pressing piece 17, the push rod valve sleeve base body 9, the base body of the push rod 13 and the base body of the pressure rod 22 are all stainless steel, so that a combination of ceramic and stainless steel is adopted between the respective opposite movable parts of the water stop valve, thereby reducing frictional wear and clamping stagnation between the mating parts.

Further, the spring 2 is mounted inside the spring cover 1 and has a certain initial compression amount, and the force is transmitted by the pressure rod 22, so that when the spring 2 is in an initial state, the valve core 20 is tightly pressed against the valve port 32.

Further, as shown in FIG. 2, a valve seat through-flow groove 27 and a valve core cover through-flow groove 31 are provided inside the valve body 23, in which the valve seat through-flow groove 27 is communicated with the outlet 30, and the valve core cover through-flow groove 31 is communicated with the inlet 26. The valve body is further provided with a spring cover threaded hole 25 and a screw plug threaded hole 29, in which the spring cover threaded hole 25 is screwed to the spring cover 1 (specifically, connected to an external thread on the spring cover 1), and the screw plug threaded hole 29 is screwed to the screw plug 11 (specifically, connected to an external thread on the screw plug 11). More specifically, a push rod balance port 28 is further provided inside the valve body 23 at the side.

As shown in FIG. 1-3, a separate chamber is formed between the spring cover 1 and the pressure rod valve sleeve 4 and communicated with the pressure rod balance port 24. Inner space of the ceramic sleeve 16 is divided by the large end of the push rod 13 into two chambers, in which the upper chamber is communicated with the push rod balance port 28, and the lower chamber is communicated with the control port 12. The inner chamber of the valve seat is communicated with the outlet 30 through the valve seat through-flow hole 33 and the valve seat through-flow groove 27 in sequence, and the inner chamber of the valve core cover is communicated with the inlet 26 through the valve core cover through-flow hole 34 and the valve core cover through-flow groove 31.

Further, the spring cover 1 and the pressure rod valve sleeve 4 are sealed by a spring cover O-ring 3, the pressure rod valve sleeve 4 and the valve body 23 are sealed by a pressure rod valve sleeve static sealing ring 5, the pressure rod 22 and the pressure rod valve sleeve 4 are sealed by a pressure rod valve sleeve dynamic sealing ring 21, the valve seat 7 and the valve body 23 are sealed by a valve seat sealing ring 19, the push rod 13 and the pressing piece 17 are sealed by a pressing piece dynamic sealing ring 18, the pressing piece 17 and the valve body 23 are sealed by a pressing piece static sealing ring 8, the push rod valve sleeve base body 9 and the valve body 23 are sealed by a push rod valve sleeve sealing ring 15, and the push rod 13 and the ceramic sleeve 16 are sealed by a push rod sealing ring 10. Functions of the sealing rings are as follows: the spring cover O-ring 3 is used for isolating the seawater from the medium in the pressure rod balance port, the pressure rod valve sleeve static sealing ring 5 is used for isolating the seawater from the medium in the inlet 26, the pressure rod valve sleeve dynamic sealing ring 21 is used for isolating the medium in the pressure rod balance port from the medium in the inlet 26, the valve seat sealing ring 19 is used for isolating the medium in the inlet 26 from the medium in the outlet 30, the pressing piece static sealing ring 8 is used for isolating the medium in the outlet 30 from the medium in the push rod balance port 28, the pressing piece dynamic sealing ring 18 is used for isolating the medium in the outlet 30 from the medium in the push rod balance port 28, the push rod valve sleeve sealing ring 15 is used for isolating the seawater from the medium in the push rod balance port 28, the push rod sealing ring 10 is used for isolating the medium in the push rod balance port 28 from the medium in the control port 12, and a screw plug O-ring 14 is used for isolating the seawater from the medium in the control port 12.

The working process of the ocean depth automatic compensation type full-ocean-depth hydraulic control water stop valve according to the present invention is described below. In operation, the pressure rod balance port 24 and the push rod balance port 28 are both communicated with the deep sea environment to allow the chambers communicated with the pressure rod balance port 24 and the push rod balance port 28 to have the same pressure as the ambient pressure, and the control port 12 is connected to the deep-sea hydraulic source, so that when there is high pressure seawater at the inlet 26, the valve core 20 is tightly pressed against the valve port 32 under the action of the spring 2 and the ocean depth pressure, thereby keeping the valve port in a sealed state and blocking communication between the inlet 26 and the outlet 30; when high-pressure hydraulic oil is introduced into the control port 12, the high-pressure hydraulic oil acts on the large end of the push rod 13 to push the valve core 20 away from the valve port 32 after overcoming the spring force and the ocean depth pressure, thereby enabling communication between the inlet 26 and the outlet 30; when the high-pressure hydraulic oil acting at the control port 12 is removed, the valve core 20 is returned under the action of the spring force to continue to keep the valve port in a sealed state.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. An ocean depth automatic compensation type full-ocean-depth hydraulic control water stop valve, comprising a valve body, a valve sleeve assembly and a valve core assembly, wherein:
    the valve body has a hollow structure with an inlet and an outlet on its side, the valve sleeve assembly is embedded in the valve body and includes a spring cover, a pressure rod valve sleeve, a valve core cover, a valve seat, a pressing piece, a push rod valve sleeve base body and a screw plug which are sequentially disposed from top to bottom, the spring cover is connected to an upper end of the valve body, a pressure rod balance port is provided at an upper end of the spring cover, a groove for mounting a spring is provided at a lower end of the spring cover, a valve port and a valve seat through-flow hole are provided in the valve seat, the valve seat through-flow hole communicates the valve port with the outlet, a valve core cover chamber and a valve core cover through-flow hole are provided in the valve core cover, the valve core cover chamber is communicated with the valve port, the valve core cover through-flow hole communicates the valve core cover chamber with the inlet, the screw plug is connected to a lower end of the valve body, and a control port is provided in the screw plug;
    the valve core assembly includes a pressure rod, a valve core and a push rod which are sequentially disposed from top to bottom, the pressure rod is sequentially inserted into the pressure rod valve sleeve and the valve core cover, an upper end of the pressure rod is abutted against the spring, the valve core is disposed in a cavity formed between the valve core cover chamber and the valve port, and the push rod has a lower end mounted in the push rod valve sleeve base body and an upper end sequentially inserted into the pressing piece and the valve seat.

2. The ocean depth automatic compensation type full-ocean-depth hydraulic control water stop valve according to claim 1, wherein a ceramic sleeve is disposed between the lower end of the push rod and the push rod valve sleeve base body; the valve core is specifically a spherical valve core, preferably a zirconia ceramic ball; and the valve port is chamfered.

3. The ocean depth automatic compensation type full-ocean-depth hydraulic control water stop valve according to claim 1, wherein the spring cover and the pressure rod valve sleeve are sealed by a spring cover O-ring, the pressure rod valve sleeve and the valve body are sealed by a pressure rod valve sleeve static sealing ring, the pressure rod and the pressure rod valve sleeve are sealed by a pressure rod valve sleeve dynamic sealing ring, the valve seat and the valve body are sealed by a valve seat sealing ring, the push rod and the pressing piece are sealed by a pressing piece dynamic sealing ring, the pressing piece and the valve body are sealed by a pressing piece static sealing ring, the push rod valve sleeve base body and the valve body are sealed by a push rod valve sleeve sealing ring, and the push rod and the ceramic sleeve are sealed by a push rod sealing ring.

4. The ocean depth automatic compensation type full-ocean-depth hydraulic control water stop valve according to claim 3, wherein a valve seat through-flow groove and a valve core cover through-flow groove are provided inside the valve body, the valve seat through-flow groove is communicated with the outlet, the valve core cover through-flow groove is communicated with the inlet, a spring cover threaded hole and a screw plug threaded hole are further provided on the valve body, the spring cover threaded hole is screwed to the spring cover, and the screw plug threaded hole is screwed to the screw plug.

5. The ocean depth automatic compensation type full-ocean-depth hydraulic control water stop valve according to claim 4, wherein a part of the push rod inserted into the pressing piece and the valve seat is sprayed with ceramic, and a part of the pressure rod inserted into the pressure rod valve sleeve and the valve core cover is sprayed with ceramic.

6. The ocean depth automatic compensation type full-ocean-depth hydraulic control water stop valve according to claim 1, wherein the spring cover, the screw plug and the valve body are made of titanium alloy material, and the pressure rod valve sleeve, the valve core cover, the valve seat, the pressing piece, the push rod valve sleeve base body, the push rod and the pressure rod are made of stainless steel material.

* * * * *